United States Patent [19]
Todd

[11] Patent Number: 5,771,342
[45] Date of Patent: Jun. 23, 1998

[54] METHOD AND APPARATUS FOR DYNAMICALLY DISPLAYING CONSISTENTLY DIMENSIONED TWO-DIMENSIONAL DRAWINGS

[75] Inventor: Philip H. Todd, Brightwood, Oreg.

[73] Assignee: Saltire Software, Beaverton, Oreg.

[21] Appl. No.: 472,694

[22] Filed: Jun. 5, 1995

[51] Int. Cl.[6] .................................................... G06F 15/00
[52] U.S. Cl. ............................................................. 395/139
[58] Field of Search .................................. 395/139, 141, 395/143; 345/127, 129, 130

[56] References Cited

U.S. PATENT DOCUMENTS

4,951,227  8/1990  Todd ........................................ 364/518
5,437,008  7/1995  Gay et al. ............................... 395/161
5,452,411  9/1995  Hidaka .................................... 395/141

Primary Examiner—Phu K. Nguyen
Attorney, Agent, or Firm—Marger, Johnson, McCollom & Stolowitz P.C.

[57] ABSTRACT

A dynamic display method and apparatus includes a computer operatively connected to an external measuring device (EMD) or numeric input device. A figure approximating a real object or space and incorporating recognizable geometric elements is sketched by the user and displayed on the computer display screen. A specified geometric element of the figure is user selected and dimensioned by operation of an external measuring device. A constraint engine subsystem within the computer incorporates the dimensioning information into the figure and redraws the figure as each dimension is received from the external measuring device.

9 Claims, 7 Drawing Sheets

METHOD AND APPARATUS FOR DYNAMICALLY DISPLAYING CONSISTENTLY DIMENSIONED TWO-DIMENSIONAL DRAWINGS

BACKGROUND OF THE INVENTION

This invention relates generally to computer aided drafting and more particularly to dimension analysis of electronically generated drawings.

In a typical Computer Aided Design (CAD) system, a user generates a drawing by explicit specification of geometric entities in terms of cartesian coordinates. The user must accurately construct the drawing so as to uniquely define its geometry. In a dimension driven CAD system, the user first establishes the topologic aspects of the drawing and subsequently imposes dimension constraints. These are usually accomplished by first drafting geometric figures and then manually entering dimensions of the individual geometric elements using a computer keypad. Once the user has supplied the necessary information, a scale drawing is generated by dimension analysis of the topologic structure and dimension constraints imposed thereon.

In traditional CAD drawing techniques, as the user draws, the lengths and angles are defined. Constructions are made similar to manual board techniques wherein lines, points and other geometric elements are each separate entities and thus not associated with each other. Using these prior art techniques, changing the length of a line requires adjusting the lengths of lines that are associated with the line being changed. For example, changing the height of a box requires changing the length of the two sides and translating the top to the new height.

In newer constraint-based drawing systems such as that disclosed in U.S. Pat. No. 4,951,227 to Todd, implemented commercially as geometric elements within a figure are interrelated and constrained to particular dimensions. This is called associated geometry. For instance, a figure having three lines interconnected at their endpoints would be recognized as either a triangle or a Y-shaped figure depending on how it is drawn. Drawing the three lines as a closed polygon and then defining the dimensions of two sides and an intervening angle of a sketched triangle uniquely defines that triangle. The geometry of the triangle is considered maximally dimensioned since all geometric elements within the triangle are uniquely defined. Further constraint of any additional elements within the geometry would be redundant.

CAD systems utilizing prior art constraint engines, however, have several drawbacks. First, dimension input is limited to keyboard or pen based input. Thus, a user is required to manually input a known measurement of a physical space. This is often time consuming when the system must be used in the field since an object must be measured by a physical instrument and the measurement must be manually input into the CAD system.

A second drawback is the limited feedback inherent in prior art constraint systems. A sketched figure must be maximally dimensioned and thus uniquely defined before the figure is resized and displayed to accurate scale. This is illustrated in FIG. 1 which shows the progressive dimensioning of elements within a geometric figure wherein the side lengths of the quadrangle and the radius and location of the circle within the quadrangle are defined in successive steps. In the prior art, the coordinate data defining the geometric elements of the figure are not updated as the figure is dimensionally defined and the figure is not redrawn to scale until the figure is maximally dimensioned (see FIG. 1D). It is only when the angular disposition of the quadrangle sides is defined to be perpendicular (FIG. 1E), thereby making the quadrangle a rectangle, that the entire figure is redrawn to scale.

Accordingly, a need remains for a computer drafting system which allows a user to observe the interrelation of geometric elements as each of the elements are being dimensioned. Additionally, a need remains for a drafting system capable of receiving measurement information directly from a measuring device and associating the measurement with the dimension of a geometric element selected within the drafting system.

SUMMARY OF THE INVENTION

It is, therefore, an object of the invention to enabling dynamically display of geometric interrelations of geometric elements as each dimension is entered into the system.

Another object of the invention is to enable input of dimensioning data directly from a measuring device and associate the data with a selected geometric element within the computer drafting system.

The dynamic display apparatus includes an input means such as a pen-based computer or digitizing tablet having display means operatively connected to the input means for constructing a geometric figure composed of geometric elements. A geometry recognizer determines whether each element of the figure is, for instance, a line, circle, or arc. Using a geometry selector, a user selects a geometric element to be measured and then operates an external measuring device such as a laser, optical or ultrasonic range finder, electric tape measure or global positioning system to generate data representing a measurement of a real object. The selected element is then associated with the real object measured. An interface operatively connecting the data output of the measuring means to the display means converts the data to a graphically displayed geometric magnitude associated with the geometric element.

The method of consistently dimensioning and dynamically displaying the elements on a display means includes entering a first and second geometric element on a computer display screen. The two elements have a first and second apparent magnitude respectively which are linked with their respective graphical sizes on the display means. A user then assigns a first input dimension to the first geometric element using input means or directly from an external measuring device as discussed above. The computer responds by associating the first input dimension with a scaling factor of the computer display screen. The input dimension of the first geometric element is then graphically displayed on the computer screen. The user then assigns a second real dimension to the second geometric element which is subsequently displayed on the computer screen. The computer responds by changing the apparent magnitude of the second element by a ratio of the second real dimension to the scaling factor.

The key advantage of this invention is that it allows the user to create a scaled layout of an object automatically from a rough hand drawn sketch. Time is saved because the user is no longer required to manually input dimension data into the CAD system. The display need not have an initial scale or grid. The hand drawn lines need not be drawn to any fixed or relative scale.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1 including

FIG. 5 including

DETAILED DESCRIPTION

Figure 1A:
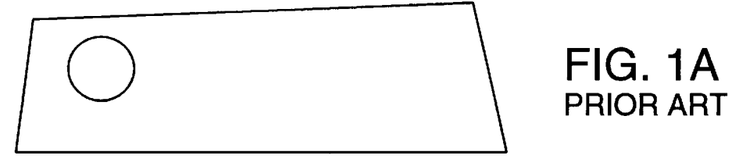
FIGS 1A–1E shows, in five progressive steps, the display of a geometric figure as each element of the figure is constrained only after maximal dimensioning using a prior art constraint system.
Figure 1B:
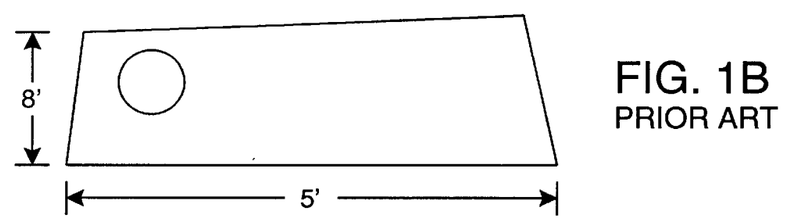
Figure 1C:
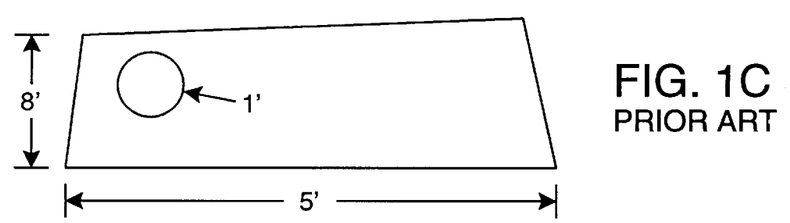
Figure 1D:
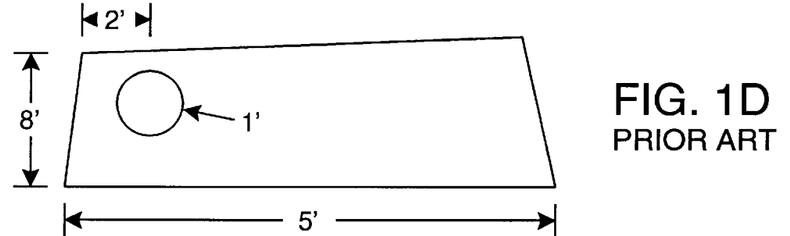
Figure 1E:
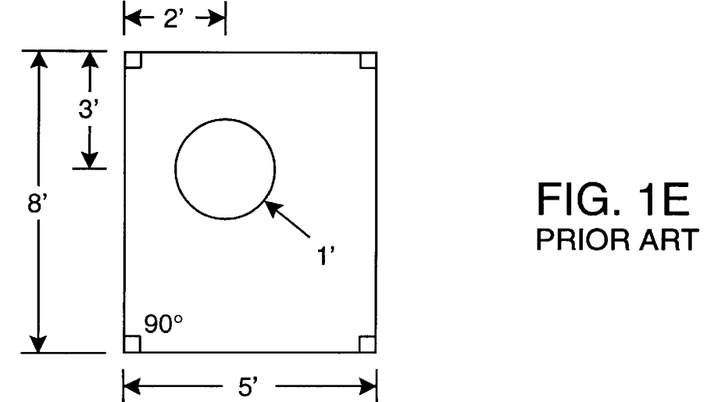
Figure 2:
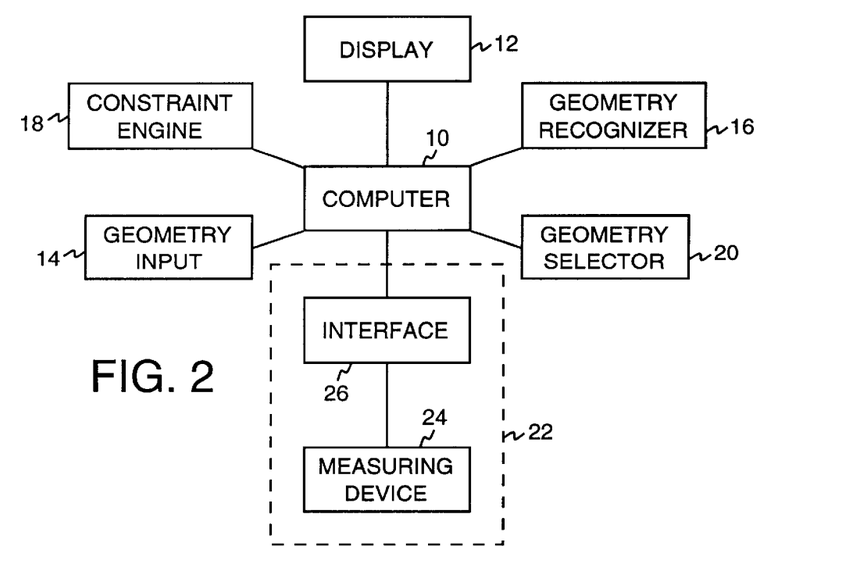
FIG. 2 is a block diagram showing the components of the apparatus constructed in accordance with the invention.

FIG. 2 shows in block diagram form a computer drafting apparatus in accordance with the present invention. The apparatus includes a computer 10 having a computer display 12 connected thereto. The computer also has input means 14 such as a keyboard, mouse and/or pen-based system for entering geometric data. The input can include sketching on a digitizing tablet connected to the system or otherwise moving a cursor position along a path or between endpoints of a path on a computer display screen using a mouse or other conventional pointing means. The input geometric data is associated with a geometric entity (e.g., a line, arc or circle) stored within memory by a geometry recognizer subsystem 16. The associated geometric entity is then graphically displayed on the computer display 12. A constraint engine 18 associates adjacently sketched geometric elements to form geometric figures.

A geometry selector 20 is utilized by an operator to select a particular geometric element to be dimensioned. The selected element can be highlighted or otherwise identified on display 12 to facilitate identification by an operator. The dimension of the selected element can be input at 22 by any one of several ways. The most common method is inputting the information from a computer keypad. Another more recent method is the use of a pen-based input system wherein the dimension is drawn on a touch sensitive screen, digitizer tablet or pen-computer. An example of a pen-based input system is U.S. patent application No. 08/152,455 which is incorporated by reference. Then, a character recognition program converts the dimension to a value, and the value is associated and displayed with the selected element.

The final and most preferred method for inputting dimensioning information into a drawing is using an external measuring device 24 which supplies dimensioning data directly to computer 10 through an interface 26. Measuring device 24 must be capable of outputting a digital signal which corresponds to the value measured. Examples of such devices include laser or ultrasound range finding devices, electronic compasses, digital rulers, electronic calipers and global positioning systems (GPS).

A laser range finder, such as that marketed under the name Data-Disto by Leica, Inc. can be used to measure distances between two points and modified to output the distances in digital form (e.g., ASCII over an RS-232 interface). Thus, for instance, the length of a room may be measured by placing the device against a wall and reflecting a beam off the opposite wall thus obtaining a measurement signal corresponding to a distance or length constraint. The measurement is automatically captured, digitized, formatted for serial or parallel transmission and transferred to the computer where the data is associated with the selected geometric elements in the drawing, as described in more detail below.

Positional, angular and azimuth information can also be captured electronically by alternate types of measuring devices. Data can be captured from a GPS system to locate in world-coordinates the specific location of a point on the drawing. Alternatively, it could be used to enter endpoints and intersection locations. Similarly, an electronic compass or surveying tool can be used to generate data reflecting angular changes in position.

Once the dimensioning data is captured by device 24, the data is transmitted through interface 26 to the computer. Transmission can occur by cable connection to the computer's RS-232 data port or a parallel port, or alternately sent in wireless fashion, using radio frequency (RF) or infrared (IR) signals. Interface 26 receives (and if necessary demodulates or decodes) data received from device 24 and converts it to numerical information relating to a dimension of the selected geometric element.

The selected geometric entity (e.g., a line) is then resealed (e.g., its length is set) based on the information provided by the external measuring device. The first time this is done, it sets a scale for the display space as well as the first selected entity. The rest of the geometry is modified to the same scale to accommodate each new dimension as it is added. The user can continue this process until all relevant geometry has been measured and a scaled layout of the object of interest has been created.

Figure 3:
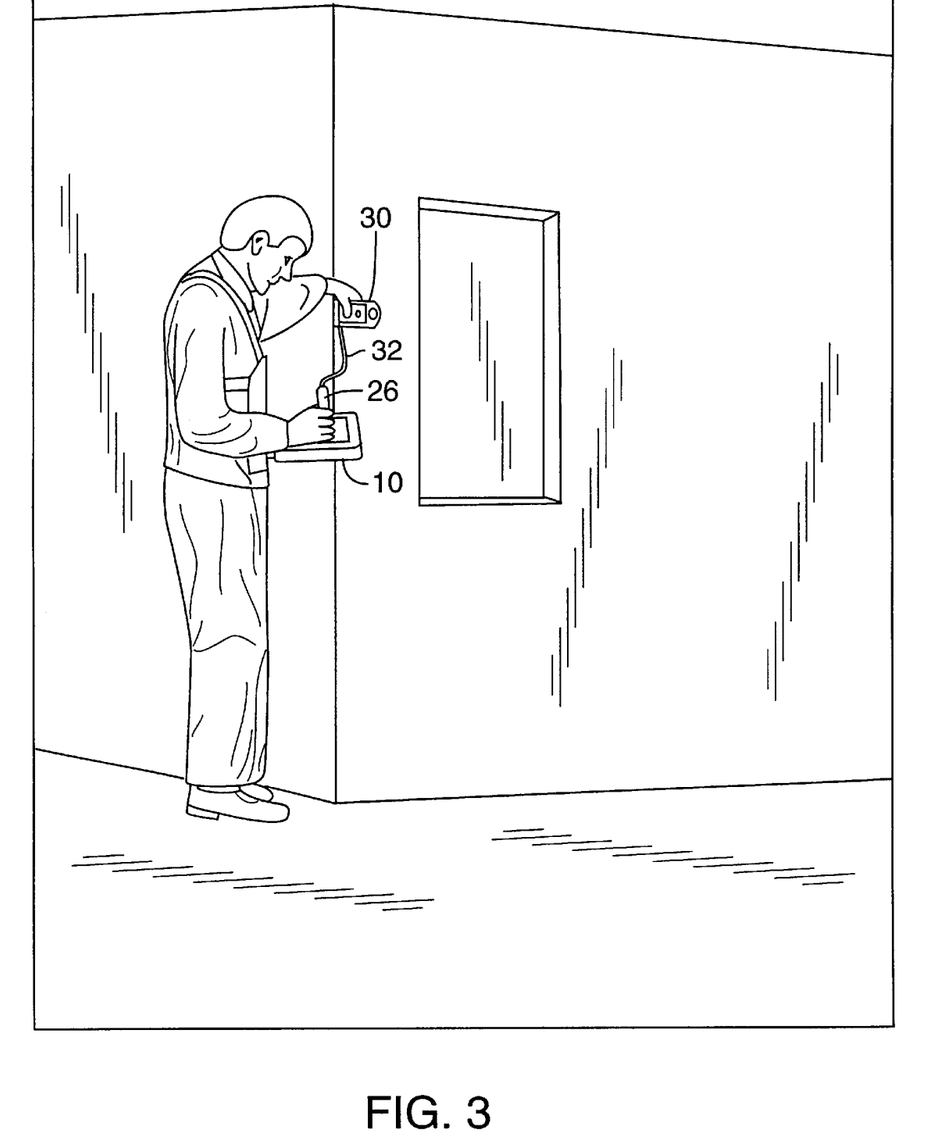
FIG. 3 illustrates how a user operates the preferred embodiment of the invention to measure a wall length.

FIG. 3 shows a preferred physical implementation of the invention. The apparatus includes a pen based computer 10 or personal digital assistant (PDA) having touch sensitive display screen 11 and housing a central processing unit, random access memory, I/O circuitry and a program and data storage or memory such as a hard disk or floppy disk. Since these elements are conventional (e.g., more suitable preferred machine) they need not be further described. A user uses a pen 28 to enter drawings and select entered geometric elements to be measured. The computer has stored within its memory a drafting constraint program, as further described below, which translates pen movements on the computer screen into base geometric shapes according to the invention.

Pen based computer 10 is operatively connected to an external measuring device (EMD) such as hand held laser range finder 30 to capture distances. Alternate measuring devices can be used to capture angular positions (e.g., electric compasses) or Cartesian coordinate positions (e.g., global positioning system (GPS)). Range finder 30 generates digital data in response to a measured distance. The data is then transmitted from ranger finder 30 through a communications link such as cable 32 (e.g., serial RS-232 data) to computer 10 where the constraint program associates the measurement with the selected geometric element and changes the display as discussed in more detail below. Alternate transmission means such as radio frequency (RF) or infrared (IR) linking can allow wireless implementation of the invention.

FIG. 3 shows an example of how the system can be used to lay out an interior room. Using pen 28, the user roughly sketches the area of interest on the computer (see FIG. 5A) and then successively adds actual lengths using the external measuring device. A user measures the length of a room by positioning the back of the laser range finder 30 against a rear wall and firing a beam toward the far wall (not shown). The beam is reflected off the far wall and detected by the range finder 30. The time delay or phase shift between the fling of the beam and detection of the reflected beam indicates a distance measurement. This distance information is automatically digitized and transmitted to the computer 10, (i.e., the drawing element selected by the user). The distance data is associated with the proper geometric entity and the constraint engine redraws the geometry to scale based on this information.

Other external measuring devices (EMD) can be used to enable measurement of larger outdoor areas such as subdivisions or traffic intersections. Data can be captured by an EMD and sent immediately to the drawing via a cable, RF, IR or other communications link. Operating under control of the software, the computer then interprets this information and assigns the dimensional value or coordinate information to the appropriate element of the drawing. The constraint engine then redraws the selected element of the geometry to scale based on the value received from the EMD. Use of the EMD is not always required. Measurements can also be input via the computer keyboard, or handwritten onto the touch screen or digitizing tablet and converted to numeric data using a character recognition (OCR) routine conventionally available for pen computers (e.g., Microsoft PenWindows).

Figure 4:
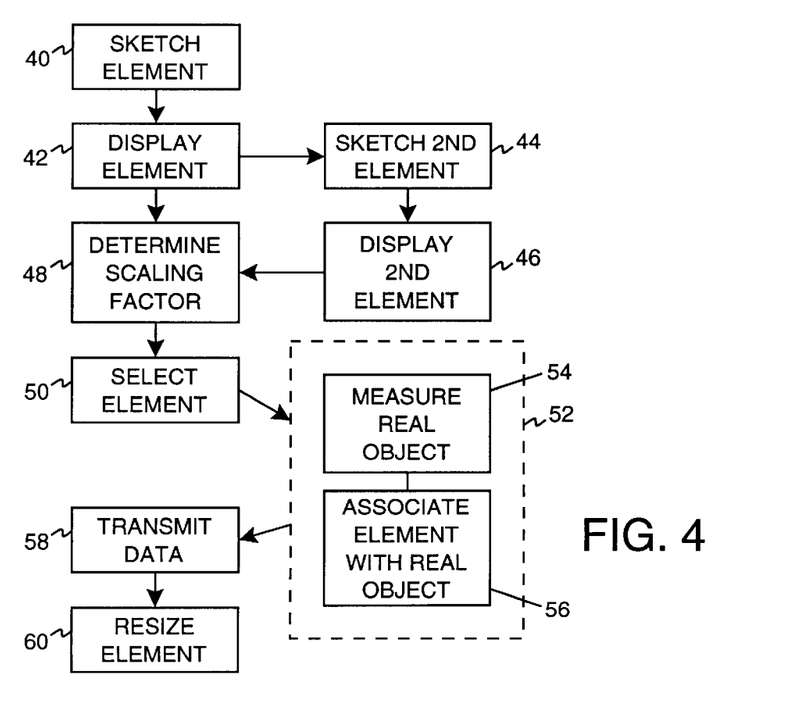
FIG. 4 is a flow chart showing the operation of the invention.

FIG. 4 shows the process by which a geometric element is dimensioned and resized within a CAD system based on measurement information received from a measuring device. A user sketches in step 40 a geometric element on a computer screen using the aforementioned conventional methods. The sketched element is then displayed in step 42 on the computer screen. A second element can be sketched in step 44 and displayed in step 46 on the computer screen. The constraint-based CAD system can then associate the two elements so that movement of one element can effect the dimensions and position of another.

Geometric elements displayed in display steps 42, 46 each have an apparent magnitude which is proportional to the pixel size or alternately the unit length or coordinate measurement of the elements on the computer screen. A scaling factor is determined in step 48 preferably by defining a given measurement according to a length on the display surface. In Windows based systems where metric units are used, this is called logical millimeters. Thus, in English units for instance, the scaling factor could be one inch is equal to ten feet. In this circumstance, the elements each have an initial measurement value based on the apparent magnitudes relative to the scaling factor. If the first element is a line with an apparent magnitude of five inches (250 pixels), and the scaling factor is one inch (50 pixels) equals ten feet, then the line represents a length of fifty feet.

An element which is to be dimensioned is selected 50 within the computer system by placing a cursor over the element and clicking the mouse button or by other conventional means. Dimension data is then generated 52 by a measuring instrument as discussed above wherein a real object is measured 54 and the real measurement value obtained is associated 56 with the selected element. The data obtained in the measuring step 54 is transmitted 58 to the computer using cable, RF or IR means discussed above. The element selected in step 50 is then immediately resized 60 on the computer screen based on the ratio of the initial measurement value to the real measurement value. All geometric elements constrained with the selected and resized element are repositioned on the display to maintain the consistent dimensioning of the figure. If the real measurement maximally defines the geometric figure of which the geometric element is associated, the system would prevent the user from redundantly defining the geometry by not accepting further entries.

Alternately, the scaling factor is related to the apparent magnitude of the first element. After the first element has been dimensioned, the real measurement of the first element divided by the apparent magnitude of the first element of the computer screen becomes, by definition, the scaling factor.

Figure 5A:
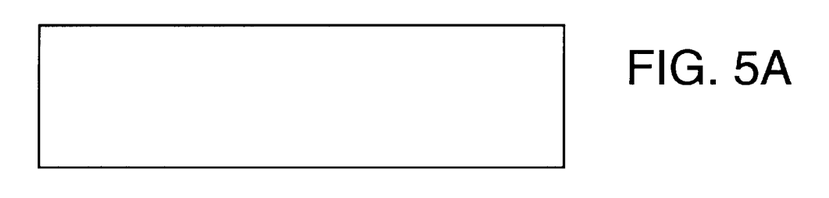
FIGS 5A–5H shows the dimensioning of elements within a geometric figure as in FIG. 1 except using the constraint engine constructed according to the present invention to partially redraw the drawings as dimensions are added.

FIGS. 5A–H shows what is occurring on the computer screen as the data is captured. FIG. 5A shows a free hand sketch that approximates the shape of the area to measured, in this case a rectangular room containing a circular table. This is preferably created on the pen based computer. Using a pen computer is easier in a mobile environment, however a standard mouse base system could be used as well.

Figure 5B:
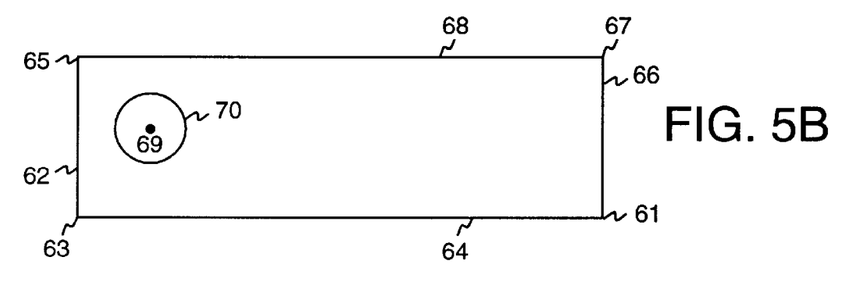

In FIG. 5B, the free hand sketch has been interpreted by the recognition algorithms and converted into lines arcs and circles. The constraint engine geometry recognizer or a similar set of algorithms convert the "ink" to vectored geometry that can have dimensions associated with it. The sketch from FIG. 5A is displayed as a rectangular box, having sides 62, 64, 66 and 68 with a circle 70, representing the table, located within the rectangle. The sides are constrained by coordinate points 61, 63, 65 and 67 and the circle location within the rectangular box is constrained by central point 69. In x,y coordinates assuming an initial arbitrary scale for displaying the elements on the screen and an offset origin point (0,0), the coordinate points are:

| Point | x-coordinate | y-coordinate |
|---|---|---|
| 61 | 301'10" | 736'6.5" |
| 63 | 301'10" | 356' |
| 65 | 1158'1.625" | 356' |
| 67 | 1158'1.625" | 736'6.5" |
| 69 | 354'5.0625" | 681'10.9375" |
| circle radius | 28'2.6875" | |

The geometry recognizer optionally includes a subroutine which interprets the sketched figure to include parallel vertical and horizontal lines having coincident endpoints.

Figure 5C:
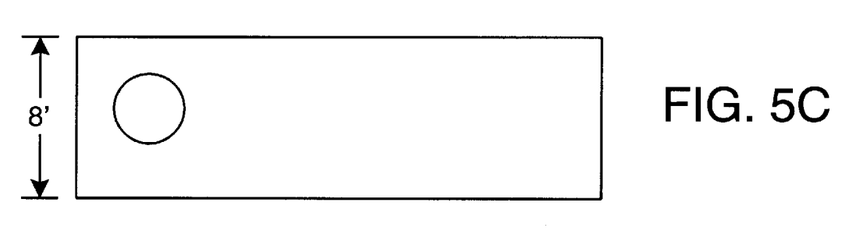
Figure 5D:
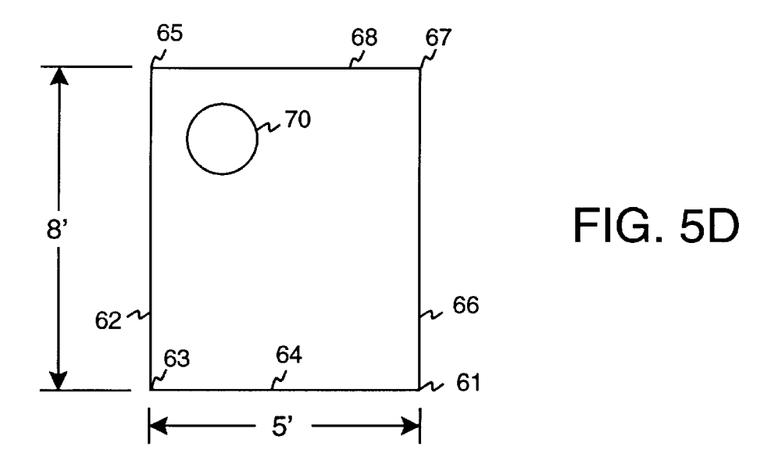

In FIG. 5C the length of wall 62 is entered by aiming the range finding device along the wall of interest and capturing its length. The length of the wall is captured and the drawing is rescaled with the new length of the wall set to 8 feet. The graphically displayed figure does not yet change in appearance until a second dimension is added in FIG. SD.

To measure wall 62, the line displayed on the computer screen representing the wall is selected by tapping on it with a pen stylus or using a standard mouse click. Dimensions can be added to wall 62 via an automatic measuring device. The user points the device at the desired target and the unit measures the distance from its location to the target. Thus, a range finder would be placed on wall 64 and fired toward opposing wall 68 to obtain a length of wall 62. The distance is measured by the device to be 8 feet. The distance measurement is automatically captured and transferred on to the drawing and associated with the previously selected line 62.

The computer constrains the figure to the new coordinates and scale thus obtaining the following coordinates:

| Point | x-coordinate | y-coordinate |
|---|---|---|
| 61 | 651'1" | 574'10" |
| 63 | 651'1" | 566'10" |
| 65 | 669'1" | 566'10" |
| 67 | 669'1" | 574'10" |
| 69 | 652'6.9375" | 573'5.625" |
| circle radius | | 6.875" |

The same procedure is used to capture the length of wall 64. The line 64 is selected and the measuring device is aimed along the wall from wall 62 toward wall 66. A measurement of 5 feet is determined by the device and the data is transmitted to the software. The constraint engine recognizes that this new dimension is associated with the selected line and redraws the line to a length equal to 5/8 of the length of line 62.

FIG. 5D shows the resizing of the figure in response to inputting dimensions of two geometric elements, namely walls 62 and 64. The resizing can be accomplished without fully dimensioning the figure, i.e. by not having the table (or circle) dimensioned or its exact position in the room defined.

Figures 5E, 5F, 5G, 5H:
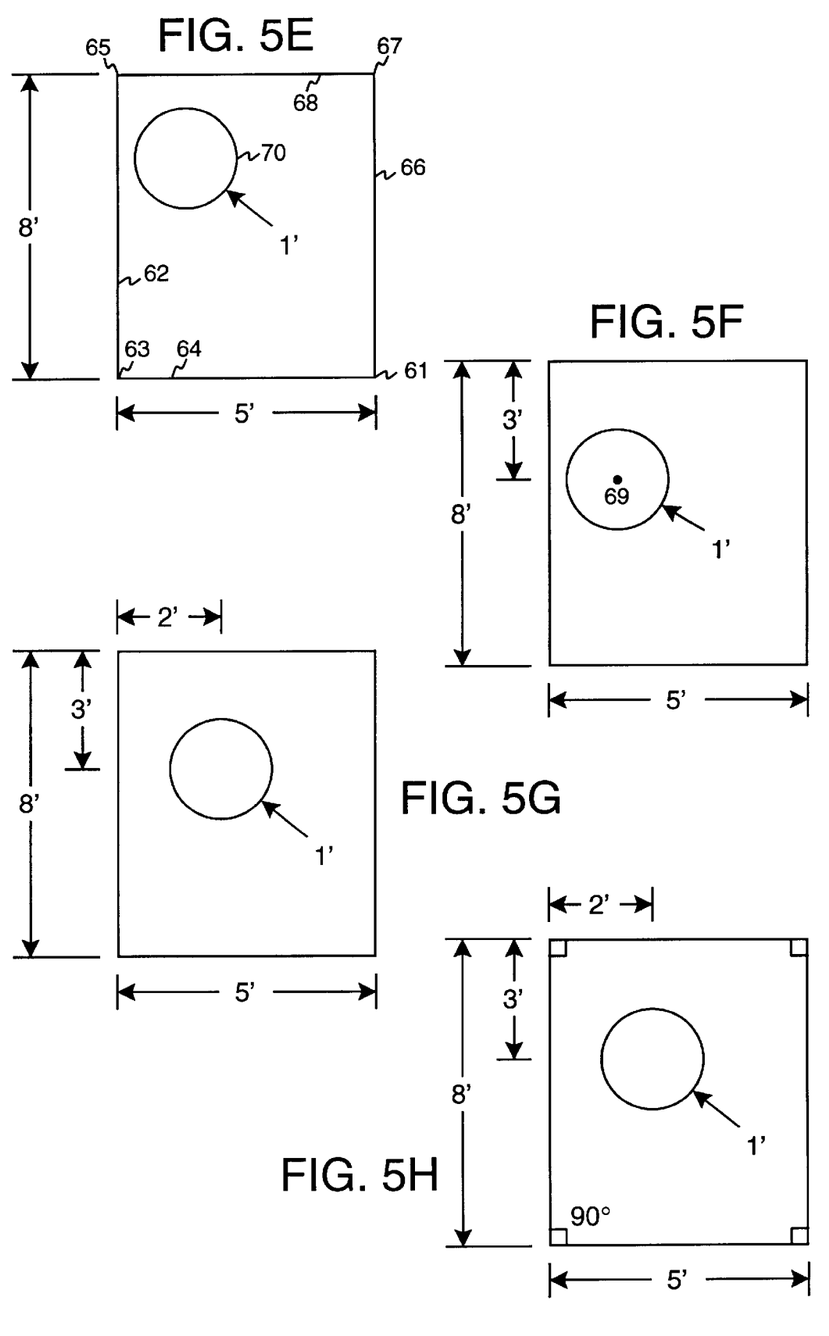

Once the room has been properly sized, the table's size and location may be input into the constraint engine. Again this information can be gathered from electronic measuring devices. In FIG. 5E, a dimension is added to the table showing its radius and the table resizes proportionately. The table is positioned in the room in FIG. 5F relative to the walls by assigning perpendicular distances between the center of the circle and the wall. Again these dimensions are provided directly by the range finder.

The coordinate points in FIGS. 5D, 5E and 5F respectively are:

| Point | x-coordinate | y-coordinate |
|---|---|---|
| 61 | 651'1" | 574'10" |
| 63 | 651'1" | 566'10" |
| 65 | 656'1" | 566'10" |
| 67 | 656'1" | 574'10" |
| 69 | 652'6.9375" | 573'5.625" |
| circle radius | | 6.875" |
| 61 | 651'1" | 574'10" |
| 63 | 651'1" | 566'10" |
| 65 | 656'1" | 566'10" |
| 67 | 656'1" | 574'10" |
| 69 | 652'6.9375" | 573'5.625" |
| circle radius | 1" | |
| 61 | 651'1" | 574'10" |
| 63 | 651'1" | 566'10" |
| 65 | 656'1" | 566'10" |
| 67 | 656'1" | 574'10" |
| 69 | 653'1" | 571'10" |
| circle radius | 1" | |

Alternatively, the table could just as easily have been a symbol that was to be added to the drawing. One of the key benefits of the constraint engine constructed according to the present invention is that symbols (new geometry) can be added without having to consistently dimension them in the drawing. There is no waiting until all the geometry has been defined to start seeing how the scaled drawing will look. In the previous engine, the room does not scale itself until all the dimensions are added not only for the room but the size of the table and its position in the room.

FIG. 5H shows the final scaled drawing of a consistently dimensioned geometric figure. The scaled drawing is based on the dimensions provided from the external measuring device. If the table geometry was not important then it did not need to be dimensioned in order to evaluate the room dimensions and the room area. The angle dimension is not needed to model the room. Instead, the computer assumes that lines drawn substantially horizontal and vertical intersect at right angles. Thus, the constraint engine assumes a rectangular geometry defined by coordinates identically defined as in FIG. 5F:

| Point | x-coordinate | y-coordinate |
|---|---|---|
| 61 | 651'1" | 574'10" |
| 63 | 651'1" | 566'10" |
| 65 | 656'1" | 566'10" |
| 67 | 656'1" | 574'10" |
| 69 | 653'1" | 571'10" |
| circle radius | 1" | |

In addition to capturing large dimensions such as floor plans and subdivisions, the same techniques can be used to measure small objects and define their actual shape and size. This has application in the machining or manufacturing of parts where it is necessary to capture the part dimensions during the machining process to determine how much additional material to remove.

Figure 6A:
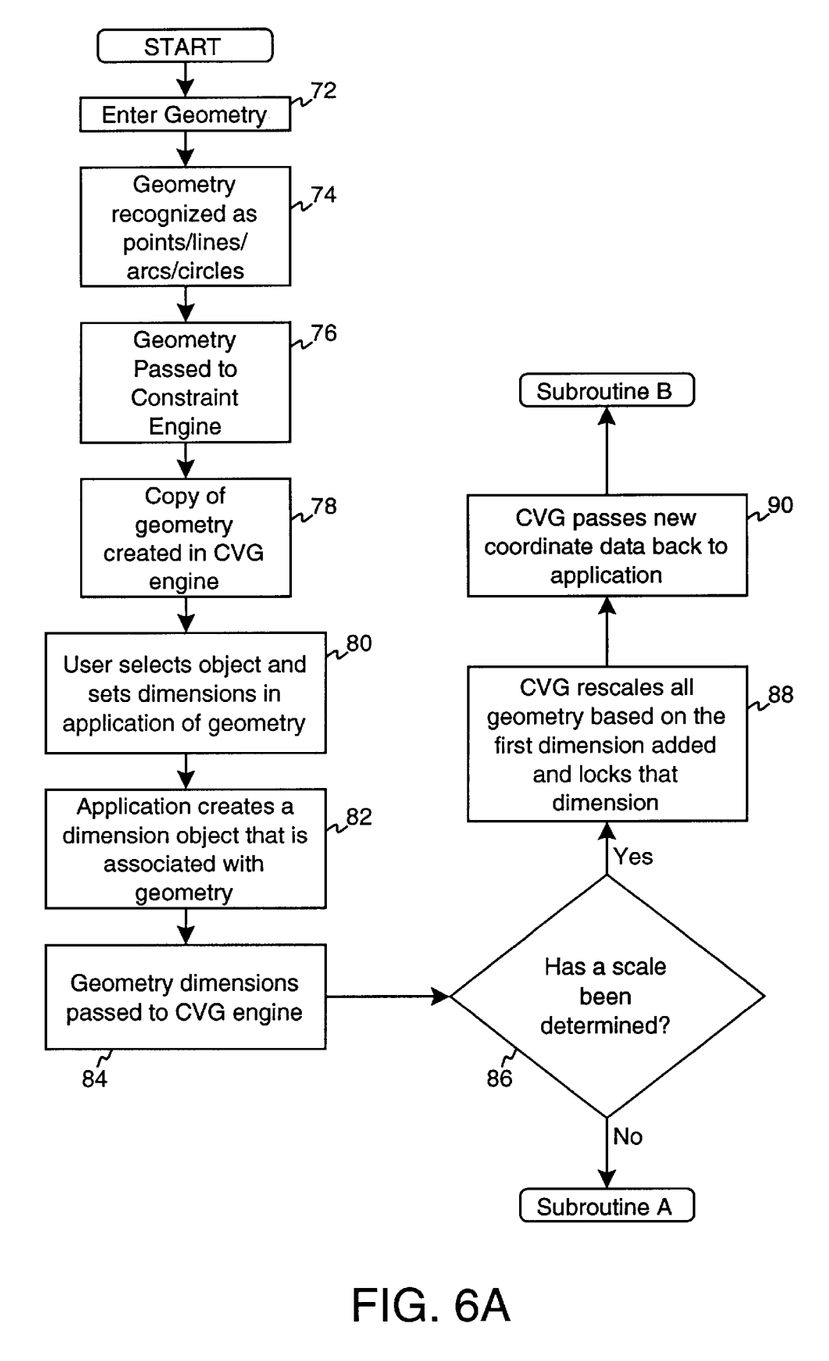
FIGS. 6A, 6B is a flow chart showing the subroutine operation of the computer readable code of the invention.
Figure 6B:
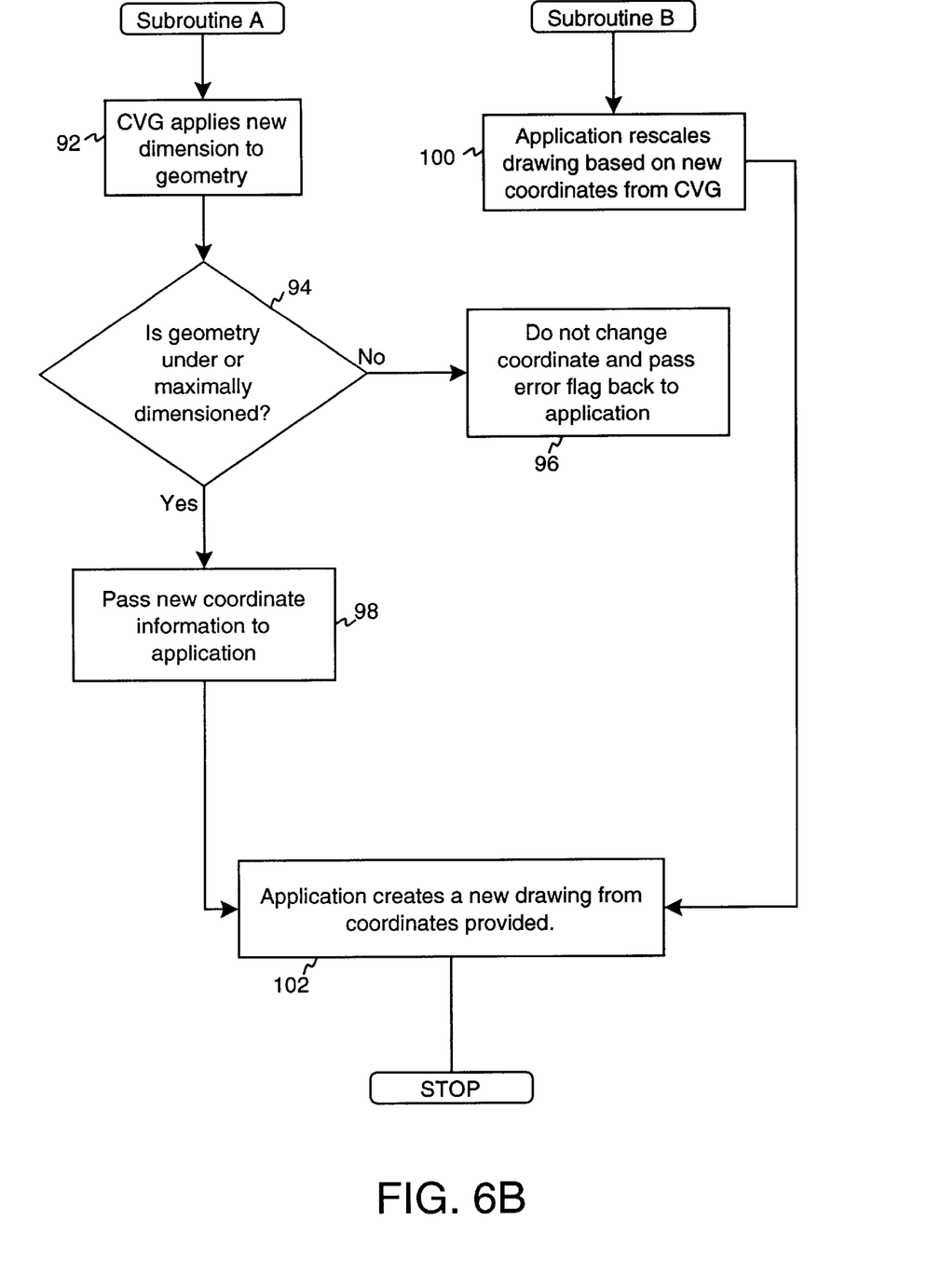

FIGS. 6A, 6B show a flow chart diagram of the subroutine steps of a computer program product according to the preferred embodiment of the invention. The computer program product is stored in a computer usable medium having computer readable program code means embodied therein. The invention code is operable in digital computers having a processor, display, memory, drawing input device and a measuring device capable of generating and inputting digital measurements to the digital computer for dimensioning and displaying geometric elements on a display.

A user initially enters geometry into a CAD application package in subroutine 72 by either a MENU mode, where certain geometries are selected, or in PEN mode, where the user moves a pointer along a display screen to leave behind a digital ink. The geometry is initially characterized by a plurality of coordinate boundary elements on the display which may, for instance, signify pixel or logical measurement information. The entered geometry is digitized for recognition by a geometry recognizer in subroutine 74. The recognizer preferably breaks down, associates the entered geometry with at least one prestored geometric element such as a point, line, arc or circle having substantially similar boundary coordinates as the selected geometries. These associated elements are then displayed.

The recognition subroutine 74 is unnecessary when the invention works In MENU mode since the geometry is preselected and thus preidentified. The geometry is passed to the constraint engine in subroutine 76 and a copy of the geometry is created in the Constrain Variable Geometry (CVG) engine in subroutine 78. Subroutine 80 then allows a user to choose a first geometric element within the displayed associated figure, said first element definable by a boundary of first element coordinates on the graphics display. The selected first geometric element is dimensioned in one of several ways. Preferably, the element is dimensioned using an electronic measuring device such as those previously listed wherein a subroutine converts the measurement data from the electronic measuring device into a dimension associated with the selected element. A second method of inputting dimension data is directly wherein the data is entered using a computer keyboard following a prompt triggered by the program code.

Following the input of dimensioning data, a dimensioned object associated with the geometry is created in subroutine 82 which is subsequently passed to the CVG engine in subroutine 84. Subroutine 86 determines if a scale for the display has been previously defined by the user, by say inputting a scale or defining a previous length or distance element. If not, then subroutine A, discussed in further detail below, is run. If a scale has been previously determined, then the CVG operates in subroutine 88 to rescale all geometry based on the first dimension added and locks that dimension to the linked first geometric element. Subroutine 90 then passes the coordinate data back to the CAD application for further processing in subroutine B discussed further below.

Referring first to subroutine A, the coordinate data is applied in subroutine 92 to the selected geometry in the CVG. Subroutine 94 calculates whether the geometry, prior to applying the newly obtained data, is under-constrained or at most maximally dimensioned. If the geometry is found by subroutine 94 to be neither under or maximally dimensioned, then the coordinate data is not applied to the geometry in the CAD application and an error flag is raised in subroutine 96 to alert the operator to the redundant dimension entry. If the geometry is found by subroutine 94 to be under or maximally dimensioned, the coordinate information is passed to the CAD application in subroutine 98 and the application creates a new drawing from the provided coordinates in step 102 using coordinate boundary constraints calculated in subroutine 92. Finally, a numerical or graphical representation of the dimension (i.e. 1'10") is displayed adjacent the selected element on the display.

If a scale has not been defined for the geometry, all of the geometry coordinates are rescaled in subroutine 100 within the CAD application based on the new coordinates from the CVG. The CAD application then creates a new drawing based on the coordinates provided in subroutine 102. A second element within the figure is then dimensioned according to the steps found in subroutine A since a scale is defined by the locking of the first element dimension.

In summary, the present invention integrates geometric constraint technology with external measuring devices to create scaled drawings automatically from a sketch. This allows the user to first create a not-to-scale sketch that reflects the layout of interest. In the preferred method, a pen-based computer is used to draw or indicate a line directly on a screen with a pen pointer. Geometry recognition algorithms then translate the sketched figure to computerized shapes by, for instance, snapping lines to vertical or smoothing a circular shape. Alternatively, a cursor may be dragged to different locations on a screen to form a sketch of a desired figure.

The constraint system constructed in accordance with the present invention overcomes a lack of immediate geometric feedback from prior art CAD systems by resizing the geometry as soon as the dimensions are added. This allows a user to scale one part of the drawing and not add dimensions to another, yet see the relevant part of the drawing to scale without regard to the exact dimensions associated with the rest of the drawing geometry.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A method of consistently dimensioning and dynamically displaying geometric elements on a computer display, the method comprising:
    entering first and second geometric elements on a computer, said first and second geometric element being associated with a geometric figure;
    displaying the first and second geometric elements on a display associated with the computer;
    sizing the first element to a first apparent dimension and the second element to a second apparent dimension respectively which are linked with respective graphical size on the display screen;
    assigning a first real dimension to the first geometric element;
    associating the first real dimension with a scaling factor of the computer display screen;
    graphically displaying the real dimension on the computer screen;
    assigning a second real dimension to the second geometric element;
    graphically displaying the real dimension on the computer screen; and
    redrawing the second element prior to the figure being maximally dimensioned so that the second element has an apparent dimension approximately equal to a ratio of the second real dimension to the scaling factor.

2. The method of claim 1, further including:
    associating the first geometric element with a first real object;
    measuring the first real object with an electronic measuring device to obtain a first geometric element measurement;
    linking the measuring device to the computer;
    electronically transmitting said measurement to said computer; and
    obtaining a first real dimension from the measurement.

3. The method of claim 2, further including:
    associating the second geometric element with a second real object;
    measuring the second real object with the electronic measuring device; and
    obtaining a second real dimension from the measurement.

4. The method of claim 1, further including displaying a table relating all of the dimensions and spacial relationships of all of the features of the drawing.

5. A dynamic display apparatus comprising:
    input means;
    display means operatively connected to the input means for constructing a geometric figure having at least one geometric element;
    a geometry selector operatively connected to the input means for selecting a geometric element to be measured;
    measuring means having a digital output, said measuring means capable of generating digital signals in response to a measured value corresponding to a geometric magnitude;
    an interface operatively connecting the digital output of the measuring means to the display means for transmitting the digital signal from the measuring means to the display means; and
    means for alerting a user that geometric figure, having a plurality of geometric magnitudes linked to geometric elements within the geometric figure, has been inconsistently dimensioned, wherein the alerting means disables the measuring means when the geometric figure of a selected element has been maximally dimensioned.

6. The apparatus of claim 5, wherein the measuring means is a laser range finder.

7. The apparatus of claim 5, wherein the measuring means is a global positioning system (GPS).

8. The apparatus of claim 5, wherein the measuring means is an electronic compass.

9. The apparatus of claim 5, wherein the display means includes:

a measurement scaling factor;

a graphic corresponding to the geometric element selected, said graphic sized on the display means relative to the scaling factor prior to the geometric figure being consistently dimensioned.

* * * * *